Patented Jan. 5, 1943

2,307,675

UNITED STATES PATENT OFFICE 2,307,675

PROCESS FOR THE PRODUCTION OF OZOKERITELIKE SUBSTANCES

Ernst Hantge, Heidelberg, and Josef Jannek, Ludwigshafen-on-the-Rhine, Germany; vested in the Alien Property Custodian No Drawing. Application September 25, 1939, Serial No. 296,527. In Germany September 24, 1938

4 Claims. (Cl. 196—14)

(Granted under the provisions of sec. 14, act of March 2, 1927; 357 O. G. 5)

The present invention relates to improvements in the production of ozokerite-like substances.

When extracts obtained in known manner by treating brown-coal with solvents at elevated temperature and under increased pressure with or without addition of catalysts, are split up by means of solvents having a selective action into a fraction comparatively rich in hydrogen and a fraction comparatively low in hydrogen, and the former fraction is subjected to one of the dewaxing processes commonly used in the mineral oil industry, solid substances are obtained which possess, to a certain extent, ozokerite-like properties, in particular a certain capacity for binding oil. These ozokerite-like properties are, however, not as pronounced in the said substances as they are in natural ozokerite, and therefore the said solid substances cannot be used as a substitute for ozokerite.

We have now found that substances having far more pronounced ozokerite-like properties are obtained by subjecting the fractions of brown-coal extracts rich in hydrogen or the ozokerite-like substances separated therefrom to a mild hydrogenation while avoiding a cracking or splitting up of the molecules. By the said treatment the oil-binding capacity of the said substances is substantially increased and, if the duration of the hydrogenation treatment is comparatively long, the color of the ozokerite-like substances is also improved substantially in that their original from dark-brown to black color changes to from white to yellow.

The brown coal extracts serving as the initial materials are obtained in the usual manner by employing solvents, such as, for example, tetrahydronaphthalene or middle oils of any origin, if desired while adding catalysts and a small quantity of hydrogen. The separation of the extracts into fractions low in hydrogren and such rich in hydrogen is equally carried out in known manner by treatment with selective solvents, such as for example aliphatic or cyclic hydrocarbons.

The fractions rich in hydrogen thus obtained may thereupon be subjected directly to a dewaxing treatment. Solvents, such as are known as agents for dewaxing purposes, are added, among which ethers, esters, ketones, halogenated hydrocarbons, alcohols, amines and organic acids may be mentioned as examples. Solvents which can be completely removed from the ozokerite-like substances at temperatures below 250° C. are preferably employed. The dewaxing is advantageously carried through by dissolving the fractions rich in hydrogen in a solvent while heating and then cooling the highly concentrated solution thus obtained; the ozokerite-like substances will then precipitate. Their melting point is more or less high, depending on the degree of cooling. If, for example, acetone is employed as the solvent and the fraction of brown-coal extracts containing the substances rich in hydrogen is heated to boiling with the acetone, the proportion of the said substances to the solvent used should be about 1 to 4 in order to obtain a complete dissolution. After cooling to 10° C., an ozokerite-like substance is precipitated, the melting point of which is about 60° C. and which has a from dark-brown to black color. However, when cooling more strongly, for example to temperatures between 20° and 40° below zero C., the yield of ozokerite-like substances will be larger, but the melting point will be lower and the oil-binding properties of the substances will be even less pronounced.

The ozokerite-like substances thus separated are then subjected to a mild hydrogenation. If this takes place for a comparatively short time only, the dark color of said substances brightens up only slightly, but their oil-binding capacity is increased substantially. If, however, hydrogen is allowed to act on the ozokerite-like substances for a longer time, then not only is the oil-binding capacity improved, but there also simultaneously occurs a considerable improvement of the color. As a result of the hydrogenation, the melting point is likewise increased, for example from about 60° to about between 63° and 66° C.

It is still more advantageous to subject the fraction containing the substances rich in hydrogen of the brown-coal extracts to the mild hydrogenation first and only then to apply to it the dewaxing treatment, since in this way the yield of ozokerite-like substances is considerably greater than when carrying through the dewaxing treatment prior to the hydrogenation.

Special care must always be taken in the hydrogenation to avoid a splitting or cracking of the ozokerite-like substances. For this reason, hydrogen pressures of at least 50 atmospheres, for example up to 600 atmospheres and preferably such between 200 and 400 atmospheres, and temperatures not exceeding about 250° C., are employed. As a rule, the temperatures used should not be lower than 150°, the most advantageous range of temperature being between 200° and 250° C. The hydrogenation is carried through in the presence of the known catalysts having a hydrogenating action, care being taken, however, that their splitting action be not too great. By way of examples metals of the 2nd to 8th groups of the periodic system, such as for example zinc, cadmium, chromium, molybdenum, tungsten, nickel and iron, or their compounds, either alone or in admixture with each other, may be mentioned. When it is desired only to improve the oil-binding properties of the ozokerite-like substances, but not to brighten up their color, the temperatures used may, as a rule, be somewhat lower than when the color is also to be improved. However, in cases where, besides the improvement of the oil-binding properties also the color is to be considerably brightened up, special care must be given to the working temperature employed, since in the event of splitting or cracking occurring in the course of the hydrogenation, the valuable properties of the ozokerite-like substances are destroyed to a more or less considerable extent.

The following examples will further illustrate how the present invention may be carried out in practice, but the invention is not limited to these examples. The parts are by weight.

*Example 1*

Mid-German brown coal is extracted with tetrahydronaphthalene at 460° C. under a pressure of 200 atmospheres. The extract obtained in a yield of 65 per cent is almost free from ashes. 10 parts of this extract are stirred at 45° C. with 58 parts of benzine boiling from 65° to 95° C. The fraction rich in hydrogen is thereby dissolved. The solution is filtered off from the residue and the filtrate refined by heating in an autoclave to about 100° C. together with 0.4 part of active charcoal, whereupon it is filtered again and freed from the benzine by distillation. 4 parts of a blackish brown paste are obtained.

This paste is then dissolved in 16 parts of methyl-ethyl-ketone while heating and the solution cooled to 20° below zero C. 1.8 parts of a dark ozokerite-like substance are thereby precipitated, which are then treated with hydrogen at a temperature of 225° C. under a pressure of 300 atmospheres in the presence of 10 per cent of a nickel catalyst. The resulting product is dissolved in 7.2 parts of methyl-ethyl-ketone, while heating, and the solution cooled to 10° C. 1.15 parts of a yellowish-white substance having a melting point of 63° C. are precipitated thereby and separated off by filtering. The product is excellently suitable for the manufacture of floor-polishing waxes and similar masses.

*Example 2*

4 parts of the black-brown paste obtained according to Example 1 representing the fraction rich in hydrogen of the brown-coal extract are treated with hydrogen in the presence of 10 per cent of a tungsten sulphide catalyst at 250° C. under a pressure of 400 atmospheres. The yellowish-white hydrogenation product obtained is then dissolved in four times its weight of acetone, while heating. By cooling to 10° C., 1.6 parts of an almost white ozokerite-like substance are precipitated from the solution, which substance has the same properties as the product obtained according to Example 1.

What we claim is:

1. The process of producing a substance similar to ozokerite which comprises preparing an extract of brown coal by treating the same with a suitable solvent at elevated temperatures and pressures, separating the resultant extract by means of a selective solvent into a fraction comparatively rich in hydrogen containing an ozokerite-like substance and a fraction comparatively low in hydrogen and subjecting the fraction rich in hydrogen to a wax recovering operation, and subjecting the wax thus separated to a mild catalytic hydrogenation at a temperature below about 250° C. while avoiding any substantial cracking, thereby lightening the color, increasing the melting point and the oil-binding properties of the ozokerite-like substance.

2. The process of producing a substance similar to ozokerite which comprises preparing an extract of brown coal by treating the same with a suitable solvent at elevated temperatures and pressures, separating the resultant extract by means of a selective solvent into a fraction comparatively rich in hydrogen containing an ozokerite-like substance and a fraction comparatively low in hydrogen, subjecting the fraction rich in hydrogen to a mild catalytic hydrogenation at a temperature below about 250° C. while avoiding any substantial cracking, thereby lightening the color, increasing the melting point and the oil-binding properties of the ozokerite-like substance and subjecting the hydrogenation product to a wax recovering operation.

3. The process as defined in claim 2, wherein the catalytic hydrogenation is effected at between 150° and 250° C.

4. The process as defined in claim 2, wherein the hydrogenation is effected at between 150° and 250° C. in the presence of a catalyst having a pronounced hydrogenating action, but little splitting action.

ERNST HANTGE.
JOSEF JANNEK.